(12) United States Patent
Sun et al.

(10) Patent No.: US 12,132,545 B2
(45) Date of Patent: Oct. 29, 2024

(54) CHANNEL STATE INFORMATION REPORTING

(71) Applicant: Apple Inc., Cupertino, CA (US)

(72) Inventors: Haitong Sun, Irvine, CA (US); Yushu Zhang, Beijing (CN); Wei Zeng, San Diego, CA (US); Dawei Zhang, Saratoga, CA (US); Ghaith N. Hattab, Santa Clara, CA (US); Ismael Gutierrez Gonzalez, San Jose, CA (US); Anchit Malhotra, Sunnyvale, CA (US); Louay Jalloul, Cupertino, CA (US); David Neumann, Munich (DE); Ziyang Ju, Munich (DE)

(73) Assignee: Apple Inc., Cupertino, CA (US)

( * ) Notice: Subject to any disclaimer, the term of this patent is extended or adjusted under 35 U.S.C. 154(b) by 740 days.

(21) Appl. No.: 17/259,886

(22) PCT Filed: Feb. 12, 2020

(86) PCT No.: PCT/CN2020/074914
§ 371 (c)(1),
(2) Date: Jan. 12, 2021

(87) PCT Pub. No.: WO2021/159324
PCT Pub. Date: Aug. 19, 2021

(65) Prior Publication Data
US 2022/0052732 A1    Feb. 17, 2022

(51) Int. Cl.
*H04B 7/06* (2006.01)
*H04J 13/00* (2011.01)

(52) U.S. Cl.
CPC ........... *H04B 7/0626* (2013.01); *H04B 7/063* (2013.01); *H04B 7/0632* (2013.01); *H04B 7/0639* (2013.01); *H04J 13/004* (2013.01)

(58) Field of Classification Search
None
See application file for complete search history.

(56) References Cited

U.S. PATENT DOCUMENTS

| 11,277,187 B2* | 3/2022 | Rahman ............... H04B 7/0486 |
| 2013/0244676 A1 | 9/2013 | Koivisto et al. |

(Continued)

FOREIGN PATENT DOCUMENTS

| CN | 104243003 A | 12/2014 |
| WO | 2019/140228 A1 | 7/2019 |

OTHER PUBLICATIONS

Examination Report for IN Patent Application No. 202117002813; 5 pages; Oct. 21, 2022.

(Continued)

*Primary Examiner* — Mariela Vidal Carpio
(74) *Attorney, Agent, or Firm* — Kowert, Hood, Munyon, Rankin & Goetzel, P.C.

(57) ABSTRACT

This disclosure relates to techniques for a wireless device to perform channel state information reporting. The wireless device may receive channel state information reporting configuration information. The channel state information reporting configuration information may include an indication to use a wideband precoding matrix indicator format for 3GPP release 16 type II channel state information reporting. The wireless device may perform channel state information reporting using a different reporting configuration than 3GPP release 16 type II channel state information reporting using a wideband precoding matrix indicator format based at least in part on the channel state information reporting configuration information. The wireless device may also or alternatively perform 3GPP type I channel state information reporting using a unified spatial basis selection framework (Continued)

for rank indicators of 3 and 4 for any number of channel state information reference signal ports.

18 Claims, 4 Drawing Sheets

(56) References Cited

U.S. PATENT DOCUMENTS

| | | | |
|---|---|---|---|
| 2017/0111098 A1 | 4/2017 | Kim | |
| 2018/0175993 A1* | 6/2018 | Onggosanusi | H04B 7/0417 |
| 2018/0359073 A1 | 12/2018 | Frenne et al. | |
| 2019/0215044 A1* | 7/2019 | Noh | H04L 5/1469 |
| 2020/0136690 A1* | 4/2020 | Noh | H04W 72/23 |
| 2020/0403676 A1* | 12/2020 | Kakishima | H04B 7/0639 |
| 2021/0297135 A1* | 9/2021 | Kim | H04L 5/0062 |
| 2021/0367652 A1* | 11/2021 | Wernersson | H04B 7/0634 |
| 2022/0094504 A1* | 3/2022 | Wu | H04B 7/0695 |
| 2022/0132564 A1* | 4/2022 | Ouchi | H04W 72/0453 |
| 2022/0239360 A1* | 7/2022 | Faxér | H04B 7/0478 |
| 2022/0271814 A1* | 8/2022 | Hao | H04B 7/0639 |
| 2022/0321189 A1* | 10/2022 | Wei | H04W 8/24 |
| 2022/0416861 A1* | 12/2022 | Manolakos | H04B 7/0658 |

OTHER PUBLICATIONS

Extended European Search Report for EP 20848782.7; Dec. 3, 2021.

"3rd Generation Partnership Project; Technical Specification Group Radio Access Network; NR; Physical layer procedures for data (Release 16)"; 3GPP TS 38.214 v16.0.0; Dec. 2019.

Qualcomm Inc. "CSI Enhancement for MU-MIMO Support"; 3GPP TSG RAN WG1 Meeting #97 R1-1909271; Prague, Czech Republic; Aug. 26-30, 2019.

Motorola Mobility et al. "Type II MU-CSI Enhancement"; 3GPP TSG RAN WG1 Meeting RAN1#98 R1-1909147; Prague, Czech Republic; Aug. 26-30, 2019.

International Search Report and Written Opinion for PCT/CN2020/074914, mailed Nov. 18, 2020, 9 pages.

Qualcomm Incorporated Remaining issues on CSI Enhancement for MU-MIMO Support 3GPP TSG RAN WG1 Meeting #99 R1-1912966, Nov. 9, 2019.

* cited by examiner

CHANNEL STATE INFORMATION REPORTING

PRIORITY CLAIM

This application is a national phase entry of PCT application number PCT/CN2020/074914, entitled "Channel State Information Reporting," filed Feb. 12, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for a wireless device to perform channel state information reporting.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

In order to provide improved communication between a base station (BS) and wireless user equipment (UE) devices, the UE may calculate various metrics that indicate channel quality for feedback to the base station. Without loss of generality, these metrics may be referred to collectively as channel state information (CSI). The UE may generate various metrics for a channel based on a received downlink (DL) reference signal, and these metrics may be used in determining the channel state information that is provided to the base station as feedback, indicating the quality of the channel. These metrics may include estimation of the spectral efficiency, the number of data layers, the pre-coding matrices in the scenarios of multiple input and multiple output (MIMO) antenna systems, etc. CSI for a channel can also be computed based on other performance metrics, such as signal-to-noise ratio (SNR), signal-to-interference plus noise ratio (SINR), signal-to-noise plus distortion ratio (SNDR), and so forth of the channel.

The base station can use this channel state information to adjust its communication with the UE to provide improved communication with the UE. For example, this channel state information may be used by the BS to determine code rates and a modulation scheme to be assigned to each UE. The code rates and modulation scheme may be selected not only to maximize the throughput to a particular UE, but also to improve the overall throughput of the base station communication area (e.g., the cell) through scheduling. The use of channel quality information thus allows the base station to more fully exploit the status of the wireless channel to improve communication throughput with various UEs.

Given that channel state information is used by the base station to improve downlink communication with UEs, the generation of appropriate CSI is very important. Therefore, improvements in the field are desirable.

SUMMARY

Embodiments are presented herein of apparatuses, systems, and methods for a wireless device to perform channel state information (CSI) reporting.

At least in some instances, it may be possible for a wireless device to be instructed to perform channel state information reporting according to any of multiple possible reporting approaches. For example, in 3GPP NR, it could be possible for a wireless device to be configured to perform release 15 type I channel state information reporting, release 15 type II channel state information reporting, or release 16 type II channel state information reporting. It may be the case that such different types of channel state information reporting have different characteristics, e.g., such that different types of reporting may be more useful than others in different scenarios, and/or that multiple concurrent types of reporting may be useful in certain scenarios.

According to the techniques described herein, a wireless device may receive CSI reporting configuration information indicating to use a wideband precoding matrix indicator (PMI) for 3GPP release 16 type II CSI reporting. As wireless device behavior in such a scenario may not currently be specified according to 3GPP specification documents, various possible techniques for the wireless device to perform CSI reporting based on the CSI reporting configuration information in such a scenario are described herein.

Also according to the techniques described herein, a wireless device may be configured to perform 3GPP type I CSI reporting using a unified framework for spatial basis selection. Thus, for example, the wireless device may be configured to perform CSI Reporting using the same spatial basis selection approach when configured to perform 3GPP type I CSI reporting with a rank indicator (RI) of 3 or 4 and a number of CSI reference signal (CSI-RS) ports equal to or greater than 16 as when configured to perform 3GPP type I CSI reporting with a RI of 3 or 4 and a number of CSI-RS ports less than 16.

Such techniques may help ensure consistent wireless device behavior and/or may reduce the complexity of wireless device implementation, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
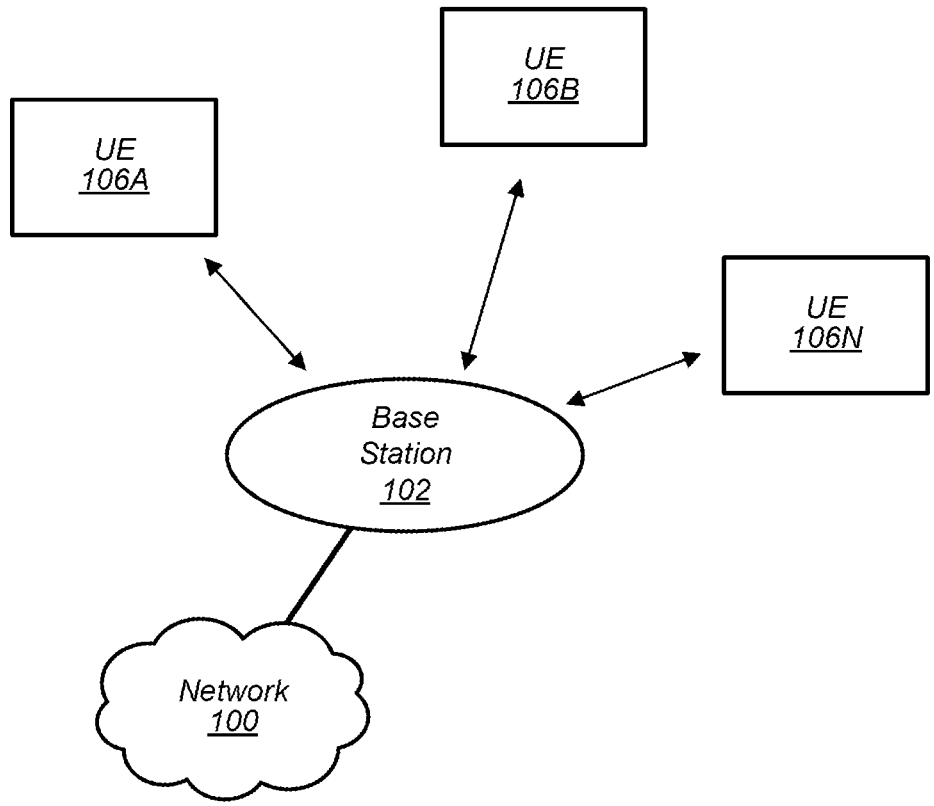
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
CSI: Channel State Information
CSI-RS: Channel State Information Reference Signals
CQI: Channel Quality Indicator
PMI: Precoding Matrix Indicator
RI: Rank Indicator

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
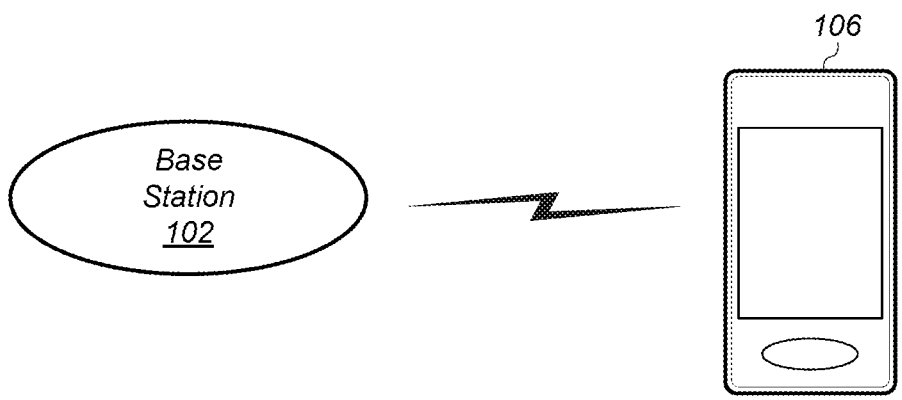
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to re-establish a packet data network connection such as according to the various methods described herein. The UE 106 might also or alternatively be configured to communicate using WLAN, BLUETOOTH', one or more global navigational satellite systems (GNSS, e.g., GPS or GLO- NASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
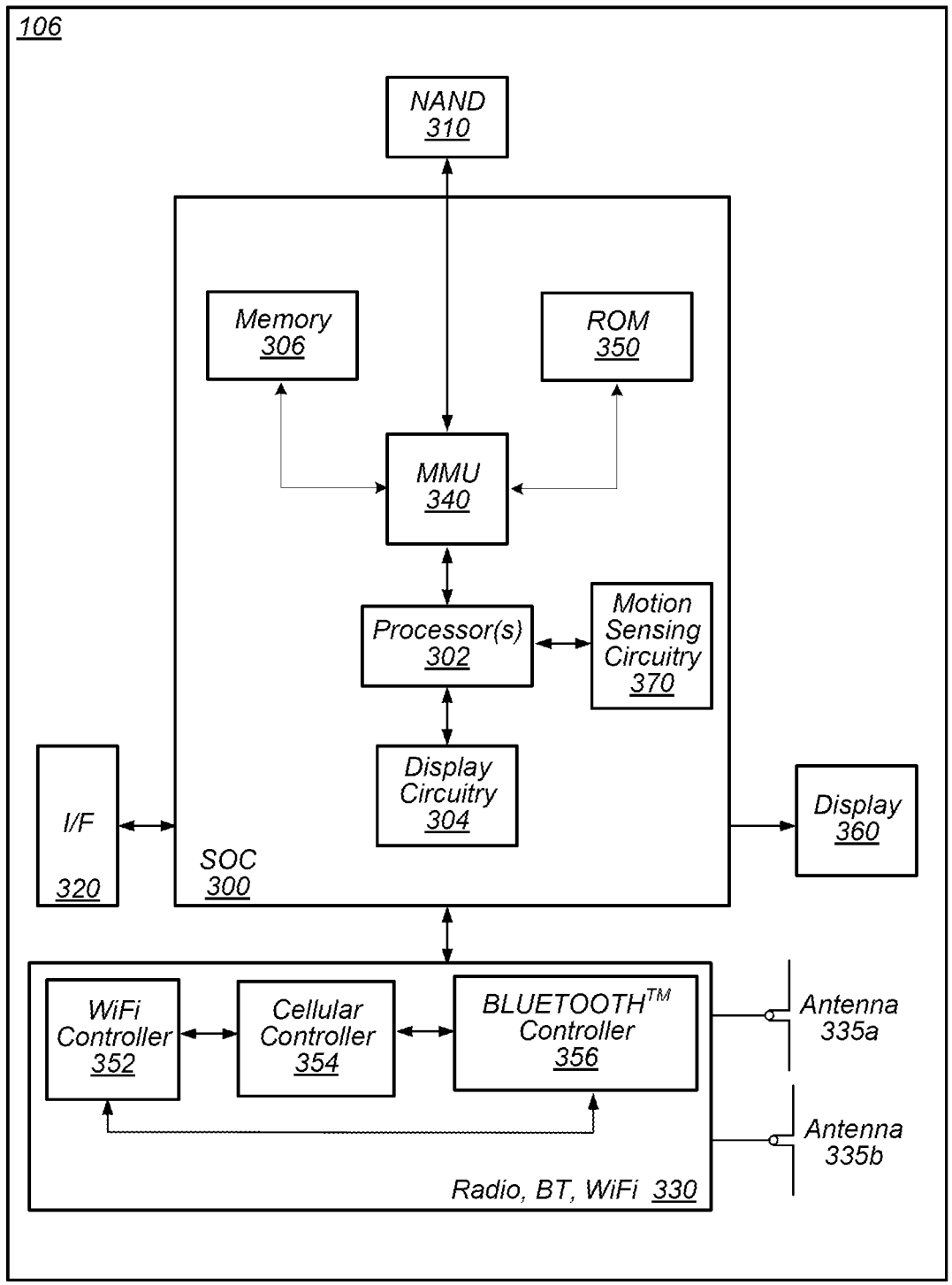
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform channel state information reporting such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform channel state information reporting according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
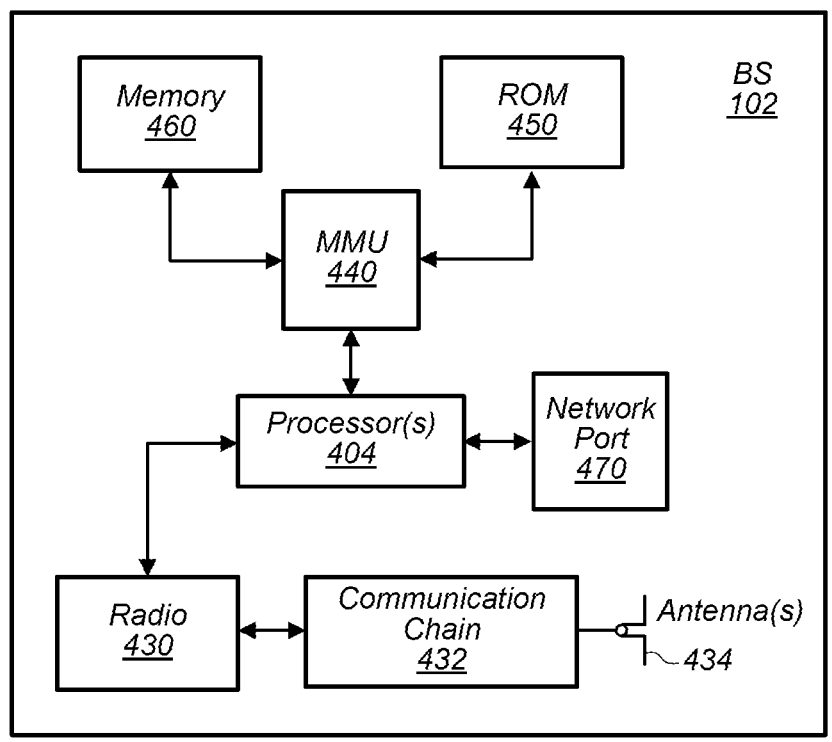
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Channel State Information

A wireless device, such as a user equipment, may be configured to measure the quality of the downlink channel and report information related to this quality measurement to the base station. For example, the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In most cellular systems, the base station transmits a pilot signal (or a reference signal), such as channel state information reference signals (CSI-RS), where this reference signal is used for estimating a channel (or a portion of a channel) between the base station and a UE. The UE receives this reference signal and based on this reference signal calculates channel state information (CSI). The UE then reports this channel state information back to the base station. The base station may then generate downlink data based on the received CSI and transmit this downlink data to the UE. Stated another way, the base station may adjust the manner in which downlink data is coded and generated based on the received channel state information from the UE.

As an example, in the 3GPP NR cellular communication standard, the channel state information fed back from the UE may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CCI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
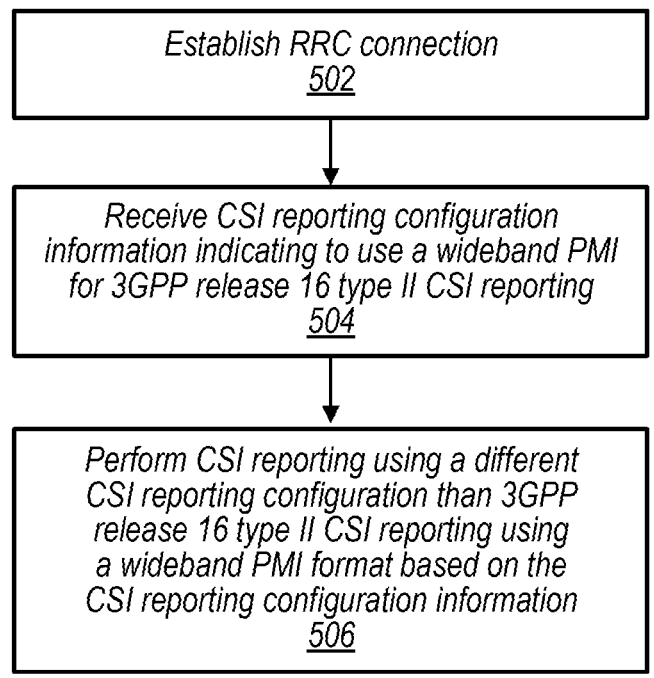
FIGS. 5-6 are flowchart diagrams illustrating aspects of exemplary possible methods for a wireless device to perform channel state information reporting, according to some embodiments.
Figure 6:
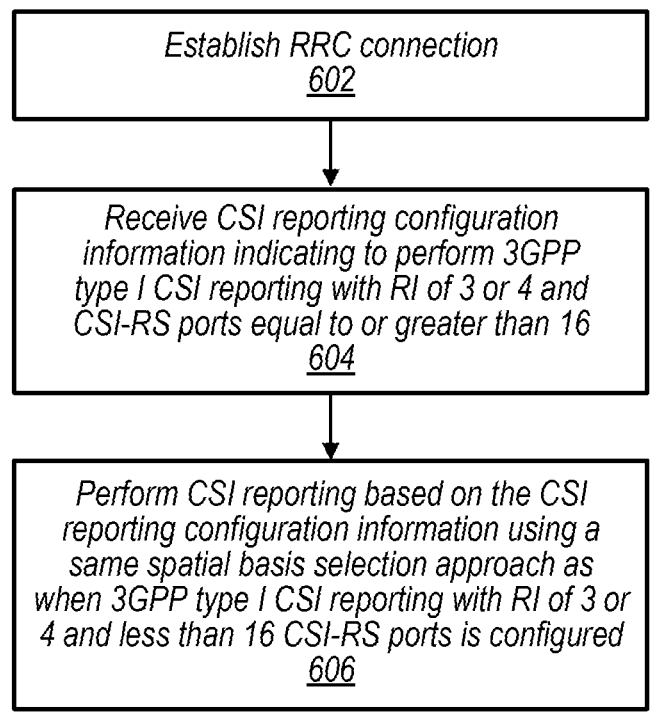

FIGS. 5-6—Channel State Information Reporting

FIGS. 5-6 are flowchart diagrams illustrating methods for a wireless device (e.g., a wireless user equipment (UE) device, as one possibility) to perform channel state information reporting.

Aspects of the methods of FIGS. 5-6 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the methods of FIGS. 5-6 are described in a manner relating to the use of communication techniques and/or features associated with 3GPP and/or NR specification documents, such description is not intended to be limiting to the disclosure, and aspects of the methods of FIGS. 5-6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the methods of FIGS. 5-6 may operate as follows.

FIG. 5 is a flowchart diagram illustrating a method for a wireless device (or UE) to perform CSI reporting when the wireless device receives configuration information indicating to perform 3GPP release 16 type II CSI reporting with a wideband PMI, according to some embodiments.

In 502, the wireless device may establish a wireless link with a cellular base station. According to some embodiments, the wireless link may include a cellular link according to LTE. For example, the wireless device may establish a session with a mobility management entity of the cellular network by way of an eNB that provides radio access to the cellular network. As another possibility, the wireless link may include a cellular link according to 5G NR. For example, the wireless device may establish a session with an AMF entity of the cellular network by way of a gNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In 504, the wireless device may receive channel state information (CSI) reporting configuration information. The CSI reporting configuration information may include an indication to use a wideband precoding matrix indicator (PMI) format for 3GPP release 16 type II CSI reporting, at least according to some embodiments.

3GPP Release 16 Type II CSI reporting may be a type of CSI reporting that may utilize overhead compression, e.g., that can be performed using Discrete Fourier Transform (DFT) vectors as a frequency basis, and that may allow for higher resolution CSI feedback than at least some other types of CSI reporting. For example, it may be the case that 3GPP Release 16 Type II CSI reporting supports a greater number of layers, spatial bases, and/or subbands than 3GPP Release 15 CSI reporting. 3GPP Release 16 Type II CSI reporting may be configured with Rank 3 or 4, and with L=6 spatial basis, at least in some instances. As one possibility, the following equation may be used for such 3GPP Release 16 Type II CSI reporting:

$$[w^l(1) \ \ldots \ w^l(N_3)] = W^l$$

$$\longleftarrow 2L \longrightarrow \qquad \longleftarrow M \longrightarrow$$

$$\left(\begin{matrix}v_0 & \cdots & v_{L-1} & & \\ & & & v_0 & \cdots & v_{L-1}\end{matrix}\right)\left(\begin{matrix}\tilde{c}_{0,1,l} & \cdots & \tilde{c}_{0,M,l} \\ \vdots & \ddots & \vdots \\ \tilde{c}_{2L-1,1,l} & \cdots & \tilde{c}_{2L-1,M,l}\end{matrix}\right)\left(\begin{matrix}w_{f,1}^H \\ \vdots \\ w_{f,M}^H\end{matrix}\right)$$

$$W_1 \qquad\qquad W_2^l \qquad\qquad W_f^H$$

where $W_1$ provides the spatial basis, $W_2^l$ provides the compressed combination coefficients, and $W_f^H$ provides the frequency basis.

The introduction of overhead compression may result in such 3GPP Release 16 Type II CSI reporting being more efficient than 3GPP Release 15 Type II CSI reporting for subband CSI reporting, at least in some instances. However, for wideband CSI reporting, it may be the case that the overhead compression used for 3GPP Release 16 Type II CSI reporting would result in higher complexity with minimal or no efficiency gains (e.g. as the overhead introduced by the overhead compression technique may as much or more than the amount of overhead that could be compressed by the overhead compression technique).

Nonetheless, for such 3GPP Release 16 Type II CSI reporting, it may be the case that the network can indicate wideband PMI reporting, e.g., by setting a "pmi-FormatIndicator" parameter equal to "widebandPMI". In such a scenario, UE behavior may not yet be clearly specified, and so it may be beneficial to consider possible ways for a UE to respond to such a configuration, particularly in view of the possible inefficiency of performing wideband PMI reporting for 3GPP Release 16 Type II CSI.

Accordingly, in 506, the UE may perform CSI reporting based at least in part on the CSI reporting configuration information. At least in some instances, the UE may use a different CSI reporting configuration than 3GPP Release 16 Type II CSI reporting using a wideband PMI format.

As one such possibility, when a UE is configured with release 16 type II CSI reporting, and when wideband PMI is configured along with subband CQI, the UE may ignore the wideband PMI indication and instead perform the 3GPP Release 16 Type II CSI reporting using a subband PMI (e.g., based on the subband CQI configuration).

As another possibility, when concurrent CSI reporting is configured, and one of the configured types of CSI reporting is release 16 type II CSI reporting with wideband PMI, the UE may drop the release 16 type II CSI reporting with wideband PMI. The UE may still perform the other configured type(s) of CSI reporting, at least according to some embodiments. Note that the concurrent CSI reporting could be considered to be occurring based at least in part on the active set of CSI-RS resources; for example, when the UE needs to concurrently process multiple active CSI-RS resources belonging to different CSI reports, the UE may determine that concurrent CSI reporting is configured. As another possibility, concurrent CSI reporting could be considered to be occurring based at least in part on a CSI piggyback on a physical uplink shared channel (PUSCH) during a report. The concurrent CSI reporting could include type I CSI being configured concurrently with the release 16 type II CSI, or release 15 type II CSI being configured concurrently with the release 16 type II CSI, among various possibilities. Such concurrent CSI reporting might be configured when periodic or semi-persistent CSI reporting scheduling coincides with aperiodic CSI reporting scheduling, among various other possibilities.

As a still further possibility, when a UE receives CSI reporting configuration information indicating to perform release 16 type II CSI reporting with wideband PMI, the UE may perform an alternate type of CSI reporting. For example, the UE could be configured to perform type I CSI reporting with wideband PMI. As another example, the UE could be configured to perform release 15 type II CSI reporting with wideband PMI if RI is 1 or 2. Note that in this example, it may be the case that the UE drops the CSI report if RI is 3 or 4 (e.g., as release 15 type II CSI reporting for RI of 3 or 4 may not be supported), or that the UE uses type I CSI reporting with wideband PMI if RI is 3 or 4. As a still further example, the UE could be configured to perform release 15 type II CSI reporting with wideband PMI, even if RI is 3 or 4, but with an extension of release 15 type II CSI reporting to support such reporting. In this example, the extension of release 15 type II CSI reporting with wideband PMI to RI of 3 or 4 may include selection of L spatial bases in a layer common manner, and the UE independently providing feedback for each of the strongest coefficient indication $i_{1,3,l}$, the amplitude $i_{1,4,l}$, the phase $i_{2,1,l}$, and the number of non-zero spatial basis/polarization $M_l$, for each layer, at least as one possibility.

As a yet further possibility, when the UE receives CSI reporting configuration information indicating to perform release 16 type II CSI reporting with wideband PMI, the UE may feedback release 16 type II CSI assuming the number of CQI subbands is equal to 1 (e.g., instead of any configured minimum number of CQI subbands, such as 3). In such a scenario, the number of PMI subbands ("N3") may be equal to R, which in this context may be a configurable parameter (e.g., configured in RRC to a value of either 1 or 2, according to some embodiments) that specifies the number of PMI subbands per CQI subband. Thus, at least in some embodiments, the number of frequency bases may be 1 (e.g., $M_v=1$, based on 3GPP TS 38.214 v.16.0.0: $M_v = \lceil p_v N_3 / R \rceil v$).

Note that if the UE reports release 16 type II CSI with wideband PMI as a special case with the number of CQI subbands equal to 1, it may be the case that the bitwidth of one or more CSI fields as defined in 3GPP TS 38.212 v.16.0.0 may be updated to reflect this special case. For example, for the typeII-r16 codebook and/or the typeII-PortSelection-r16 codebook, for the field $i_{1,6,l}$ (the frequency domain (FD) indicator for layer l,l=0, 1, 2, 3), the bitwidth may be defined as equal to 0, as it may be the case that only the first frequency basis is selected.

Thus, the method of FIG. 5 may help support a consistent framework for wireless device behavior when performing channel state information reporting, at least in certain circumstances.

FIG. 6 is a flowchart diagram illustrating a method for a wireless device (or UE) to perform CSI reporting using a unified spatial basis selection approach, according to some embodiments.

In 602, the wireless device may establish a wireless link with a cellular base station. According to some embodiments, the wireless link may include a cellular link according to LTE. For example, the wireless device may establish a session with a mobility management entity of the cellular network by way of an eNB that provides radio access to the cellular network. As another possibility, the wireless link may include a cellular link according to 5G NR. For example, the wireless device may establish a session with an AMF entity of the cellular network by way of a gNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In 604, the wireless device may receive channel state information (CSI) reporting configuration information. The CSI reporting configuration information may include an indication to use 3GPP Type I CSI reporting with RI of 3 or 4 and CSI-RS ports equal to or greater than 16, at least according to some embodiments.

3GPP Release 15 Type I CSI reporting currently can be configured with multiple parameters, each of which may affect the manner in which the CSI reporting is performed, at least according to some embodiments. For example, it may be the case that different designs are specified for use for each of ranks 1 and 2, 3 and 4, 5 and 6, 7, and 8. Further, for ranks 3 and 4, it may be the case that different designs are specified for use when the number of CSI-RS ports is less than 16 than when the number of CSI-RS ports is greater than or equal to 16. In particular, according to 3GPP release 15, a different spatial basis selection approach may be used when the number of CSI-RS ports is greater than or equal to 16 than when performing 3GPP Release 15 Type I CSI reporting with other sets of parameters. However, when different sets of spatial bases can be used, this may increase the UE implementation complexity, e.g., with respect to how to select the set(s) of spatial bases.

For example, according to some embodiments, for <16 ports and RI equal to 3 or 4, 3GPP release 15 type I CSI spatial basis selection may be performed as follows:

$$w_{r,l} = b_{k_1 + k'_{1,l}, k'_2 + k'_{2,l}} \times c_{r,l}, r = 0,1 (\text{polarization}), l = 0,1,\ldots,R-1(\text{layer})$$

where $b_{k_1+k'_{1,l}, k_2+k'_{2,l}}$ is an oversampled 2D DFT beam of length-$NN_2$; Orthogonal beams within beam group:

$$(k'_{1,0}, k'_{2,0}) = (k'_{1,2}, k'_{2,2}) = (0,0); k'_{1,1} = k'_{2,1} = k'_{2,3};$$

calculation and reporting is wideband (2 bits);

For $N_1 > N_2 > 1: (k'_{1,1}, k'_{2,1}) \in \{(O_1, 0), (0, O_2), (O_1, O_2), (2O_1, 0)\}$

For $(N_1, N_2) = (2,2): (k'_{1,1}, k'_{2,1}) \in \{(O_1, 0), (0, O_2), (O_1, O_2)\}$

For $(N_1, N_2) = (2,1): (k'_{1,1}, k'_{2,1}) \in \{(O_1, 0)\}$

For $(N_1, N_2) = (4,1): (k'_{1,1}, k'_{2,1}) \in \{(O_1, 0), (2O_1, 0), (3O_1, 0)\}$

For $(N_1, N_2) = (6,2): (k'_{1,1}, k'_{2,1}) \in \{(O_1, 0), (2O_1, 0), (3O_1, 0), (4O_1, 0)\};$ where $c_{0,l} = 1, c_{1,l} = (-1)^{\lfloor l/2 \rfloor} e^{j\pi n/2}, n \in \{0,1\};$ and where calculation and reporting of n can be subband (1 bit/subband).

In contrast, according to some embodiments, for ≥16 ports and RI equal to 3 or 4, 3GPP release 15 type I CSI spatial basis selection may be performed as follows:

$$w_{r,l} = \begin{bmatrix} b'_{k_1, k_2} \\ \psi_{m,l} b'_{k_1, k_2} \end{bmatrix} \times c_{r,l}$$

where $b'_{k_1, k_2}$ is an oversampled 2D DFT beam of length-$NN_2$;

$$\psi_{m,l} = (-1)^l e^{j\frac{\pi m}{4}}, m \in \{0, 1, 2, 3\};$$
$$c_{0,l} = 1, c_{1,l} = (-1)^{\lfloor l/2 \rfloor} e^{j\frac{\pi n}{2}}, n \in \{0, 1\};$$

where calculation and reporting of m is wideband (2 bits); and where calculation and reporting of n can be subband (1 bit/subband).

In order to reduce UE implementation complexity, provide a more consistent CSI reporting framework, and/or for any of various other possible reasons, it may accordingly be beneficial to unify the spatial basis selection approaches used for type I CSI reporting with RI equal to 3 or 4, at least according to some embodiments.

Accordingly, in 606, the UE may perform CSI reporting based on the CSI reporting configuration information using a same spatial basis selection approach as when 3GPP type I CSI reporting with RI of 3 or 4 and less than 16 CSI-RS ports is configured.

As one possibility for such a unified spatial basis, a UE may be allowed to report type I CSI with RI equal to 3 or 4 using the same spatial basis when the number of CSI-RS ports is greater than or equal to 16 as when the number of CSI-RS ports is less than 16, constructed from an oversampled ($O_1 = O_2 = 4$) 2D DFT matrix based on a rectangular antenna element structure (e.g., with $N_1$ and $N_2$ representing the number of antenna elements, per column and row respectively, of the rectangular antenna element structure). In such a scenario, the UE may indicate its capability, e.g., whether it supports such a unified spatial basis selection mechanism for type I CSI reporting with RI equal to 3 or 4 and with the number of CSI-RS ports is greater than or equal to 16, and/or whether it supports a different spatial basis selection mechanism (e.g., such as the spatial basis selection mechanism specified for release 15 type I CSI reporting with RI equal to 3 or 4 and with the number of CSI-RS ports is greater than or equal to 16). The network may correspondingly configure the UE with which spatial basis selection approach is to be used by the UE for type I CSI reporting when RI is equal to 3 or 4 and the number of CSI-RS ports is greater than or equal to 16, e.g., in accordance with its indicated capability.

In some instances, when a 3GPP release 16 UE reports type I CSI with RI equal to 3 or 4 using a unified spatial basis, when the number of CSI-RS ports is greater than or equal to 16, the 3GPP release 15 type I CSI spatial basis selection approach for <16 ports and RI equal to 3 or 4 (e.g., as described previously herein) may be extended to support the spatial basis selection for ≥16 ports using one of the following options.

As a first option, the UE may choose the spatial basis independently for each layer, with the spatial basis being the same for different polarizations within the same layer. Within each layer, the second polarization can have the phase coefficient reported.

As a second option, up to 2 independent spatial bases can be chosen by the UE, where one spatial basis is selected for layers 0 and 2, and another set of spatial bases can be selected for layers 1 and 3. Within each set of layers (e.g., which use the same spatial basis), an orthogonal cover code can be used between polarizations, such as:

$$\begin{bmatrix} w & w \\ \theta w & -\theta w \end{bmatrix}$$

where $\theta$ is a phase coefficient used to ensure that the final precoder reported by the UE is orthogonal.

As a third option (e.g., as a more direct extension of the release 15 design for RI equal to 3 or 4 when the number of CSI-RS ports is <16, 1 spatial basis may be chosen by the UE for layers 0 and 2, and another spatial basis can be selected for layers 1 and 3, within a limited specified set of shifts from the first spatial basis. Similar to the second option, within each set of layers (e.g., which use the same spatial basis), an orthogonal cover code can be used between polarizations, such as:

$$\begin{bmatrix} w & w \\ \theta w & -\theta w \end{bmatrix}$$

where $\theta$ is a phase coefficient used to ensure that the final precoder reported by the UE is orthogonal.

To extend the release 15 design for RI equal to 3 or 4 when the number of CSI-RS ports is <16, to use the same spatial basis for when the number of CSI-RS ports is ≥16, it may be the case that the following design for $k'_{1,1}$ and $k'_{2,1}$ can be used, at least as one possibility.

For $(N_1,N_2)=(4,2):(k'_{1,1},k'_{2,1}) \in \{(O_1,0),(2O_1,0),(0,O_2),(2O_1,O_2)\}$

For $(N_1,N_2)=(8,1):(k'_{1,1},k'_{2,1}) \in \{(O_1,0),(2O_1,0),(4O_1,0),(6O_1,0)\}$

For $(N_1,N_2)=(6,2):(k'_{1,1},k'_{2,1}) \in \{(2O_1,0),(4O_1,0),(0,O_2),(4O_1,O_2)\}$

For $(N_1,N_2)=(4,3):(k'_{1,1},k'_{2,1}) \in \{(O_1,0),(3O_1,0),(0,O_2),(3O_1,O_2)\}$

For $(N_1,N_2)=(12,1):(k'_{1,1},k'_{2,1}) \in \{(2O_1,0),(4O_1,0),(6O_1,0),(8O_1,0)\}$

For $(N_1,N_2)=(8,2):(k'_{1,1},k'_{2,1}) \in \{(2O_1,0),(4O_1,0),(0,O_2),(4O_1,O_2)\}$

For $(N_1,N_2)=(4,4):(k'_{1,1},k'_{2,1}) \in \{(O_1,0),(3O_1,0),(0,O_2),(3O_1,O_2)\}$

For $(N_1,N_2)=(16,1):(k'_{1,1},k'_{2,1}) \in \{(3O_1,0),(6O_1,0),(9O_1,0),(12O_1,0)\}$

Thus, the method of FIG. 6 may help reduce wireless device implementation complexity with respect to channel state information reporting by providing a unified basis for performing spatial basis selection for 3GPP type I CSI reporting with rank 3 or 4, at least in certain circumstances.

In the following further exemplary embodiments are provided.

One set of embodiments may include an apparatus, comprising: a processor configured to cause a wireless device to: establish a radio resource control (RRC) connection with a cellular base station; receive channel state information (CSI) reporting configuration information, wherein the CSI reporting configuration information includes an indication to use a wideband precoding matrix indicator (PMI) format for 3GPP release 16 type II CSI reporting; and perform CSI reporting using a different CSI reporting configuration than 3GPP release 16 type II CSI reporting using a wideband PMI format based at least in part on the CSI reporting configuration information.

According to some embodiments, the CSI reporting configuration information further includes an indication to use a subband channel quality indicator (CQI) format, wherein the processor is further configured to cause the wireless device to: perform 3GPP release 16 type II CSI reporting using a subband PMI format based at least in part on the CSI reporting configuration information.

According to some embodiments, the processor is further configured to cause the wireless device to: receive CSI reporting configuration information configuring one or more of 3GPP type I CSI reporting or 3GPP release 15 type II CSI reporting concurrent with the 3GPP release 16 type II CSI reporting; drop the 3GPP release 16 type II CSI reporting based at least in part on the CSI reporting configuration information configuring one or more of 3GPP type I CSI reporting or 3GPP release 15 type II CSI reporting concurrent with the 3GPP release 16 type II CSI reporting and the indication to use a wideband PMI format for 3GPP release 16 type II CSI reporting; and perform the 3GPP type I CSI reporting or 3GPP release 15 type II CSI reporting based at least in part on the CSI reporting configuration information.

According to some embodiments, the processor is further configured to cause the wireless device to: perform 3GPP type I CSI reporting with a wideband PMI based at least in part on the CSI reporting configuration information.

According to some embodiments, the processor is further configured to cause the wireless device to: determine a rank indicator (RI) for the CSI reporting; perform 3GPP release 15 type II CSI reporting with a wideband PMI based at least in part on the CSI reporting configuration information if the RI is determined to be 1 or 2; and drop the 3GPP release 16 type II CSI reporting or perform 3GPP type I CSI reporting based at least in part on the CSI reporting configuration information if the RI is determined to be 3 or 4.

According to some embodiments, the processor is further configured to cause the wireless device to: perform 3GPP release 15 type II CSI reporting with a wideband PMI based at least in part on the CSI reporting configuration information, wherein if a rank indicator (RI) is 3 or 4, to perform the 3GPP release 15 type II CSI reporting with a wideband PMI, the processor is further configured to cause the wireless device to: perform spatial basis selection for the CSI reporting in a layer common manner; and report strongest coefficient indication, amplitude, phase, and number of non-zero spatial bases/polarizations for each layer.

Another set of embodiments may include a wireless device, comprising: an antenna; a radio operably coupled to the antenna; and a processor operably coupled to the radio; wherein the wireless device is configured to: establish a first radio resource control (RRC) connection; receive channel state information (CSI) reporting configuration information, wherein the CSI reporting configuration information includes an indication to use a wideband precoding matrix indicator (PMI) format for 3GPP release 16 type II CSI reporting; and perform a second type of CSI reporting based at least in part on the CSI reporting configuration information, wherein the second type of CSI reporting is not 3GPP release 16 type II CSI reporting using a wideband PMI format.

According to some embodiments, the wireless device is further configured to: perform 3GPP release 16 type II CSI reporting with number of channel quality indicator (CQI) subbands equal to 1 based at least in part on the CSI reporting configuration information.

According to some embodiments, the wireless device is further configured to: select a number of PMI subbands equal to R for the 3GPP release 16 type II CSI reporting, wherein R is a parameter indicating a number of PMI subbands per CQI subband, wherein an indication of a value of R is received by the wireless device in RRC configuration information.

According to some embodiments, the wireless device is further configured to: set a bitwidth of a frequency domain indicator field to 0 for the 3GPP release 16 type II CSI reporting with number of CQI subbands equal to 1.

According to some embodiments, the CSI reporting configuration information further includes an indication to use a subband channel quality indicator (CQI) format, wherein the wireless device is further configured to: perform 3GPP release 16 type II CSI reporting using a subband PMI format based at least in part on the CSI reporting configuration information.

According to some embodiments, the wireless device is further configured to: receive CSI reporting configuration information configuring the second type of CSI reporting concurrent with the 3GPP release 16 type II CSI reporting; and drop the 3GPP release 16 type II CSI reporting based at least in part on the CSI reporting configuration information configuring the second type of CSI reporting concurrent with the 3GPP release 16 type II CSI reporting and the indication to use a wideband PMI format for 3GPP release 16 type II CSI reporting.

According to some embodiments, the second type of CSI reporting comprises one of: 3GPP type I CSI reporting with a wideband PMI; or 3GPP release 15 type II CSI reporting with a wideband PMI.

According to some embodiments, a rank indicator (RI) is 3 or 4, wherein the second type of CSI reporting comprises 3GPP release 15 type II CSI reporting with a wideband PMI, wherein the wireless device is further configured to: perform spatial basis selection for the CSI reporting in a layer common manner; and report strongest coefficient indication, amplitude, phase, and number of non-zero spatial basis/polarization for each layer.

Yet another set of embodiments may include a method, comprising: by a wireless device: establishing a first radio resource control (RRC) connection; receiving channel state information (CSI) reporting configuration information, wherein the CSI reporting configuration information configures the wireless device to perform 3GPP type I CSI reporting with a rank indicator (RI) of 3 or 4 and with a number of CSI reference signal (CSI-RS) ports equal to or greater than 16; performing 3GPP type I CSI reporting with the RI of 3 or 4 and with the number of CSI-RS ports equal to or greater than 16 using a first spatial basis selection approach; receiving CSI reporting configuration information, wherein the CSI reporting configuration information configures the wireless device to perform 3GPP type I CSI reporting with a RI of 3 or 4 and with a number of CSI-RS ports less than 16; and performing 3GPP type I CSI reporting with the RI of 3 or 4 and with the number of CSI-RS ports less than 16 using the first spatial basis selection approach.

According to some embodiments, the method further comprises: providing capability information indicating that the wireless device supports using the first spatial basis selection approach when performing 3GPP type I CSI reporting with the RI of 3 or 4 and with the number of CSI-RS ports equal to or greater than 16; and receiving configuration information indicating to use the first spatial basis selection approach when performing 3GPP type I CSI reporting with the RI of 3 or 4 and with the number of CSI-RS ports equal to or greater than 16, wherein performing 3GPP type I CSI reporting with the RI of 3 or 4 and with the number of CSI-RS ports equal to or greater than 16 using the first spatial basis selection approach is based at least in part on the configuration information indicating to use the first spatial basis selection approach when performing 3GPP type I CSI reporting with the RI of 3 or 4 and with the number of CSI-RS ports equal to or greater than 16.

According to some embodiments, the method further comprises: selecting a spatial basis for each data layer according to the first spatial basis selection approach, wherein the selection of the spatial basis for each data layer is independent of the selection of the spatial basis for each other data layer.

According to some embodiments, the method further comprises: selecting a spatial basis for each data layer according to the first spatial basis selection approach, wherein a same spatial basis is selected for at least a first set of data layers comprising 2 data layers.

According to some embodiments, an orthogonal cover code is applied between polarizations within a set of layers for which the same spatial basis is selected.

According to some embodiments, a spatial basis for a second set of data layers is selected from a specified subset of possible spatial bases, wherein the specified subset of possible spatial bases comprises spatial bases at specified shifts from the spatial basis selected for the first set of data layers.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A processor configured to cause a wireless device to:
   establish a radio resource control (RRC) connection with a cellular base station;
   receive channel state information (CSI) reporting configuration information, wherein when the CSI reporting configuration information includes an indication to use a subband channel quality indicator (CQI) and a wideband precoding matrix indicator (PMI) format for 3GPP release 16 type II CSI reporting, the processor is further configured to cause the wireless device to:
   perform 3GPP release 16 type II CSI reporting using a subband precoding matrix indicator (PMI) format based at least in part on the CSI reporting configuration information and without regard to a pmi-FormatIndicator parameter which is set to widebandPMI; and
   perform 3GPP release 15 type II CSI reporting with the wideband PMI based at least in part on the CSI reporting configuration information, wherein if a rank indicator (RI) is 3 or 4, to perform the 3GPP release 15 type II CSI reporting with the wideband PMI, the processor is further configured to cause the wireless device to:
   perform spatial basis selection for the CSI reporting in a layer common manner; and
   report strongest coefficient indication, amplitude, phase, and number of non-zero spatial bases/polarizations for each layer.

2. The processor of claim 1, wherein the CSI reporting configuration information configures concurrent CSI reporting including one or more of 3GPP type I CSI reporting or the 3GPP release 15 type II CSI reporting concurrent with the 3GPP release 16 type II CSI reporting, and wherein the processor is further configured to cause the wireless device to:
   drop the 3GPP release 16 type II CSI reporting based at least in part on the CSI reporting configuration information configuring one or more of 3GPP type I CSI reporting or 3GPP release 15 type II CSI reporting concurrent with the 3GPP release 16 type II CSI reporting and the indication to use the subband CQI and the wideband PMI format for 3GPP release 16 type II CSI reporting; and
   perform the 3GPP type I CSI reporting or 3GPP release 15 type II CSI reporting based at least in part on the CSI reporting configuration information.

3. The processor of claim 2, wherein the processor is further configured to cause the wireless device to:
   perform the 3GPP type I CSI reporting with the wideband PMI based at least in part on the CSI reporting configuration information.

4. The processor of claim 2, wherein the concurrent CSI reporting occurs based at least in part on a CSI piggyback on a physical uplink shared channel (PUSCH) during a report.

5. The processor of claim 1, wherein the concurrent CSI reporting is configured when periodic or semi-persistent CSI reporting scheduling coincides with aperiodic CSI reporting scheduling.

6. A wireless device, comprising:
   an antenna;
   a radio operably coupled to the antenna; and
   a processor operably coupled to the radio;
   wherein the wireless device is configured to:
   establish a first radio resource control (RRC) connection;
   receive channel state information (CSI) reporting configuration information, wherein when the CSI reporting configuration information includes an indication to use a subband channel quality indicator (CQI) and a wideband precoding matrix indicator (PMI) format for 3GPP release 16 type II CSI reporting, the wireless device is further configured to:
   perform 3GPP release 16 type II CSI reporting using a subband precoding matrix indicator (PMI) format based at least in part on the CSI reporting configuration information and without regard to a pmi-FormatIndicator parameter which is set to widebandPMI; and
   perform 3GPP release 15 type II CSI reporting with the wideband PMI based at least in part on the CSI reporting configuration information, wherein if a rank indicator, RI, is 3 or 4, to perform the 3GPP release 15 type II CSI reporting with the wideband PMI, wherein the wireless device is further configured to:
   perform spatial basis selection for the CSI reporting in a layer common manner; and
   report strongest coefficient indication, amplitude, phase, and number of non-zero spatial bases and polarizations for each layer.

7. The wireless device of claim 6, wherein the 3GPP release 16 type II CSI reporting is performed with a number of CQI subbands equal to 1 based at least in part on the CSI reporting configuration information.

8. The wireless device of claim 7, wherein the wireless device is further configured to:
select a number of PMI subbands equal to R for the 3GPP release 16 type II CSI reporting, wherein R is a parameter indicating a number of PMI subbands per CQI subband, wherein an indication of a value of R is received by the wireless device in RRC configuration information.

9. The wireless device of claim 7, wherein the wireless device is further configured to:
set a bitwidth of a frequency domain indicator field to 0 for the 3GPP release 16 type II CSI reporting with the number of CQI subbands equal to 1.

10. The wireless device of claim 6, wherein the CSI reporting configuration information configures concurrent CSI reporting including a second type of CSI reporting concurrent with the 3GPP release 16 type II CSI reporting, and wherein the wireless device is further configured to:
drop the 3GPP release 16 type II CSI reporting based at least in part on the CSI reporting configuration information configuring concurrent CSI reporting including the second type of CSI reporting concurrent with the 3GPP release 16 type II CSI reporting and the indication to use the subband CQI and the wideband PMI format for 3GPP release 16 type II CSI reporting.

11. The wireless device of claim 10, wherein the second type of CSI reporting comprises one of:
3GPP type I CSI reporting with the wideband PMI; or
the 3GPP release 15 type II CSI reporting with the wideband PMI.

12. The wireless device of claim 10, wherein the concurrent CSI reporting occurs based at least in part on a CSI piggyback on a physical uplink shared channel (PUSCH) during a report.

13. A method, comprising:
by a wireless device:
receiving channel state information (CSI) reporting configuration information, wherein when the CSI reporting configuration information includes an indication to use a subband channel quality indicator (CQI) and a wideband precoding matrix indicator (PMI) format for 3GPP release 16 type II CSI reporting, the method further comprises:
performing 3GPP release 16 type II CSI reporting using a subband precoding matrix indicator (PMI) format based at least in part on the CSI reporting configuration information and without regard to a pmi-FormatIndicator parameter which is set to wideband-PMI; and
performing 3GPP release 15 type II CSI reporting with the wideband PMI based at least in part on the CSI reporting configuration information, wherein if a rank indicator, RI, is 3 or 4, to perform the 3GPP release 15 type II CSI reporting with the wideband PMI, the method further comprises:
performing spatial basis selection for the CSI reporting in a layer common manner; and
reporting strongest coefficient indication, amplitude, phase, and number of non-zero spatial bases and polarizations for each layer.

14. The method of claim 13, further comprising:
setting a bitwidth of a frequency domain indicator field to 0 for the 3GPP release 16 type II CSI reporting with a number of CQI subbands equal to 1.

15. The method of claim 13, wherein the CSI reporting configuration information configures concurrent CSI reporting including one or more of 3GPP type I CSI reporting or the 3GPP release 15 type II CSI reporting concurrent with the 3GPP release 16 type II CSI reporting, and wherein the method further comprises:
dropping the 3GPP release 16 type II CSI reporting based at least in part on the CSI reporting configuration information configuring one or more of 3GPP type I CSI reporting or the 3GPP release 15 type II CSI reporting concurrent with the 3GPP release 16 type II CSI reporting and the indication to use the subband CQI and wideband PMI format for 3GPP release 16 type II CSI reporting; and
performing the 3GPP type I CSI reporting or 3GPP release 15 type II CSI reporting based at least in part on the CSI reporting configuration information.

16. The method of claim 15, further comprising:
performing 3GPP type I CSI reporting with the wideband PMI based at least in part on the CSI reporting configuration information.

17. The method of claim 15, wherein the concurrent CSI reporting occurs based at least in part on a CSI piggyback on a physical uplink shared channel (PUSCH) during a report.

18. The method of claim 15, wherein the concurrent CSI reporting is configured when periodic or semi-persistent CSI reporting scheduling coincides with aperiodic CSI reporting scheduling.

* * * * *